(12) United States Patent
Chernenkov et al.

(10) Patent No.: US 11,055,369 B2
(45) Date of Patent: Jul. 6, 2021

(54) AUTOMATIC CRAWLING OF APPLICATIONS

(71) Applicant: GOOGLE LLC, Mountain View, CA (US)

(72) Inventors: Dmitry Mikhailovich Chernenkov, Moscow (RU); Lennart Carl Goeran Kolmodin, Stockholm (SE); Michael Vladimirovich Reutov, Zurich (CH); Aleksey Gennadyevich Surkov, Kirkland, WA (US); Amanda Bishop, Issaquah, WA (US); Sergey Igorevich Nazarov, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/749,538

(22) Filed: Jan. 22, 2020

(65) Prior Publication Data

US 2020/0159787 A1    May 21, 2020

Related U.S. Application Data

(62) Division of application No. 15/525,004, filed as application No. PCT/RU2015/000372 on Jun. 15, 2015, now Pat. No. 10,558,715.

(51) Int. Cl.
G06F 16/951        (2019.01)
G06F 16/23         (2019.01)
G06F 16/955        (2019.01)

(52) U.S. Cl.
CPC ........ G06F 16/951 (2019.01); G06F 16/2379 (2019.01); G06F 16/9566 (2019.01)

(58) Field of Classification Search
CPC . G06F 16/951; G06F 16/9566; G06F 16/2379
See application file for complete search history.

(56) References Cited

U.S. PATENT DOCUMENTS 7,725,452 B1 *  5/2010  Randall ................. G06F 16/951
                                                 707/709
8,296,190 B1   10/2012  Lemmons et al.
(Continued)

FOREIGN PATENT DOCUMENTS

CN    104412265 A     3/2015
WO    2011064675 A1   6/2011

OTHER PUBLICATIONS

International Search Report and Written Opinion from PCT/RU2015/000372, dated Apr. 1, 2016, 10 pages.
(Continued)

*Primary Examiner* — James Trujillo
*Assistant Examiner* — Michal Bogacki
(74) *Attorney, Agent, or Firm* — Brake Hughes Bellermann LLP

(57) ABSTRACT

Systems and methods are described for generating criteria for a plurality of web applications in an online application store, translating the criteria into at least one rule, the at least one rule based on predefined categories defined by the online application store, obtaining, metadata associated with a plurality of websites, determining, using the metadata and the at least one rule, whether any of the websites in the plurality of websites, includes code that executes a feature associated with the at least one rule, and displaying the icon as a selectable listing in the online application store.

28 Claims, 5 Drawing Sheets

(56) References Cited

U.S. PATENT DOCUMENTS

| | | |
|---|---|---|
| 8,954,836 B1 | 2/2015 | Look et al. |
| 9,448,776 B1 | 9/2016 | Sankaran et al. |
| 2008/0175243 A1 | 7/2008 | Bhagwan et al. |
| 2009/0037287 A1 | 2/2009 | Baitalmal et al. |
| 2009/0276332 A1 | 11/2009 | Gharabally et al. |
| 2011/0231290 A1 | 9/2011 | Narcisse et al. |
| 2012/0166411 A1 | 6/2012 | MacLaurin et al. |
| 2012/0290583 A1 | 11/2012 | Mahaniok et al. |
| 2012/0323898 A1 | 12/2012 | Kumar et al. |
| 2013/0103550 A1 | 4/2013 | Nygaard et al. |
| 2013/0198627 A1 | 8/2013 | Claux et al. |
| 2013/0275275 A1 | 10/2013 | Lemmons et al. |
| 2013/0290344 A1 | 10/2013 | Glover et al. |
| 2013/0332442 A1 | 12/2013 | Liu et al. |
| 2014/0149382 A1 | 5/2014 | Brodsky et al. |
| 2014/0173638 A1 | 6/2014 | Anderson |
| 2014/0379925 A1 | 12/2014 | Kang et al. |

OTHER PUBLICATIONS

Sharpened Productions; "Application Definition"; techterms.com; 2019; 1 page., 2019, 1 page.

The Computer Language Co, Inc.; "Definition of: application extension"; Application extension Definition from PC Magazine Encyclopedia; pcmag.com; 2019; 2 pages., 2019, 2 pages.

* cited by examiner

AUTOMATIC CRAWLING OF APPLICATIONS

CROSS REFERENCE TO RELATED APPLICATIONS

This application is a Divisional of U.S. application Ser. No. 15/525,004 entitled "Automatic Crawling of Applications," filed May 5, 2017, which is a 35 U.S.C. § 371 National Phase Entry Application from PCT/RU2015/000372, filed Jun. 15, 2015, and designating the U.S., the disclosures of which are incorporated by reference herein in their entireties.

TECHNICAL FIELD

The subject technology generally relates to automatically crawling application content on the Internet and, in particular, relates to providing applications in a marketplace of digital goods.

BACKGROUND

Digital distribution of content can include delivery of media content over an online connection. Such content can be accessed and implemented using a web-enabled computing device. Such devices include personal computers, laptop computers, netbook computers, smartphones and cell phones, among a number of other possible devices configured to provide online content.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In some aspects, the disclosed subject matter relates to a computer-implemented method for generating criteria for a plurality of web applications in an online application store, translating the criteria into at least one rule, the at least one rule based on predefined categories defined by the online application store, obtaining, by a computing device, metadata associated with a plurality of websites, and determining, using the metadata and the at least one rule, whether any of the websites in the plurality of websites, includes code that executes a feature associated with the at least one rule. The method may also include: in response to determining at least one website includes code that executes a feature associated with the at least one rule, obtaining content associated with the at least one website and generating an icon for the website, the icon and content being configured for placement as a selectable listing in the online application store, and displaying the icon as a selectable listing in the online application store. Other embodiments of this aspect include corresponding computer systems, apparatus, and computer programs recorded on one or more computer storage devices, each configured to perform the actions of the methods.

Implementations may include one or more of the following features. The method as described above in which the criteria includes data associated with web application usage, web application installs, web application update queries, and web application user ratings. The method may also describe translating the criteria into at least one rule that includes extracting category data from the criteria and comparing the category data to the predefined categories defined by the online application store. The method may also include obtaining the metadata by performing a web crawl to search for executable code associated with a web application hosted on a website. The method may also include performing a web crawl that is configured to crawl hostnames corresponding to websites. The method may also include obtaining the metadata by receiving the metadata from a host associated with one of the plurality of websites. The method may also include the selectable listing being an application executable in a web browser. The method may also include using metadata that includes a title, a snippet, a URL, a hostname for the URL, or a label, associated with the at least one website. The method may also include providing to a host associated with the at least one website, information configured to enable the host to update the listing, and in response to receiving instructions to update the listing, performing the instructions, as well as providing the updated listing to the online application store. The method may also include periodically, and without receiving a request from a user: executing a web crawl to retrieve additional content pertaining to the plurality of websites, generating, from the additional content, an updated listing, and replacing the listing with the updated listing and providing the updated listing in the online application store. The method may also include using an updated listing that includes modified functionality based at least in part on the additional content. The method may also include generating the updated listing in response to receiving permission from a host to update the listing. The method may also include using the at least two metrics that are selected from data associated with web application usage, web application installs, web application update queries, and web application user ratings. The method may also include discarding one or more of the documents in response to determining that the one or more of the documents are not based on a user-hosted web application. The method may also include determining that one or more of the documents associated with a score that is above the threshold includes duplicate URL content, selecting a start page associated with the one or more documents, configuring and uploading content in the start page to the online application store, and discarding the duplicate URL content. The method may also include using application-like content that includes one or more executable web applications that provide functionality that is exposed as a service and accessed from a web browser. The method may also include using a plurality of web applications corresponding to applications available in an online application store and the at least two metrics correspond to a quality rating for the web applications.

In some aspects, the disclosed subject matter relates to a method for retrieving data associated with a plurality of web applications, and defining, for each of the plurality of web applications, at least two metrics corresponding to the data, defining a score for each of the plurality of web applications, the score based at least in part on the at least two metrics, defining a threshold associated with the score, and in response to performing a web crawl of documents that reside outside of an online application store, retrieving documents that include application-like content, associating a document score with each of the documents according to the metrics. The method may also include selecting, for configuration and upload to the online application store, a first portion of the documents, the first portion being associated with a document score that is above the threshold; and discarding a second portion of documents, the second portion being associated with a document score that is below the threshold. Other embodiments of this aspect include corresponding computer systems, apparatus, and computer programs recorded on one or more computer storage devices, each configured to perform the actions of the methods.

In some aspects, the disclosed subject matter relates to a system including at least one processor; memory storing instructions that, when executed by the at least one processor, cause the system to perform operations including: retrieving data associated with a plurality of web applications and defining, for each of the plurality of web applications, at least two metrics corresponding to the data, defining a score for each of the plurality of web applications, the score based at least in part on the at least two metrics, defining a threshold associated with the score, and in response to performing a web crawl of documents that reside outside of an online application store, retrieving documents that include application-like content, associating a document score with each of the documents according to the metrics. The operations may also include selecting, for configuration and upload to the online application store, a first portion of the documents, the first portion being associated with a document score that is above the threshold; and discarding a second portion of documents, the second portion being associated with a document score that is below the threshold. Other embodiments of this aspect include corresponding computer systems, apparatus, and computer programs recorded on one or more computer storage devices, each configured to perform the actions of the methods.

Implementations may include one or more of the following features. The above described system in which the at least two metrics are selected from data associated with web application usage, web application installs, web application update queries, and web application user ratings. The operations may further include discarding one or more of the documents in response to determining that the one or more of the documents are not based on a user-hosted web application. The operations may further include determining that one or more of the documents associated with a score that is above the threshold includes duplicate URL content, selecting a start page associated with the one or more documents, configuring and uploading content in the start page to the online application store, and discarding the duplicate URL content. The system may also use application-like content that includes one or more executable web applications that provide functionality that is exposed as a service and accessed from a web browser. Implementations of the described techniques may include hardware, a method or process, or computer software on a computer-accessible medium.

In some aspects, the disclosed subject matter relates to a computer. The computer includes an input device, a display device, one or more processors, and a memory. The memory includes instructions. The instructions include code for . . . .

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Like reference symbols in the various drawings indicate like elements.

DETAILED DESCRIPTION

Figure 1:
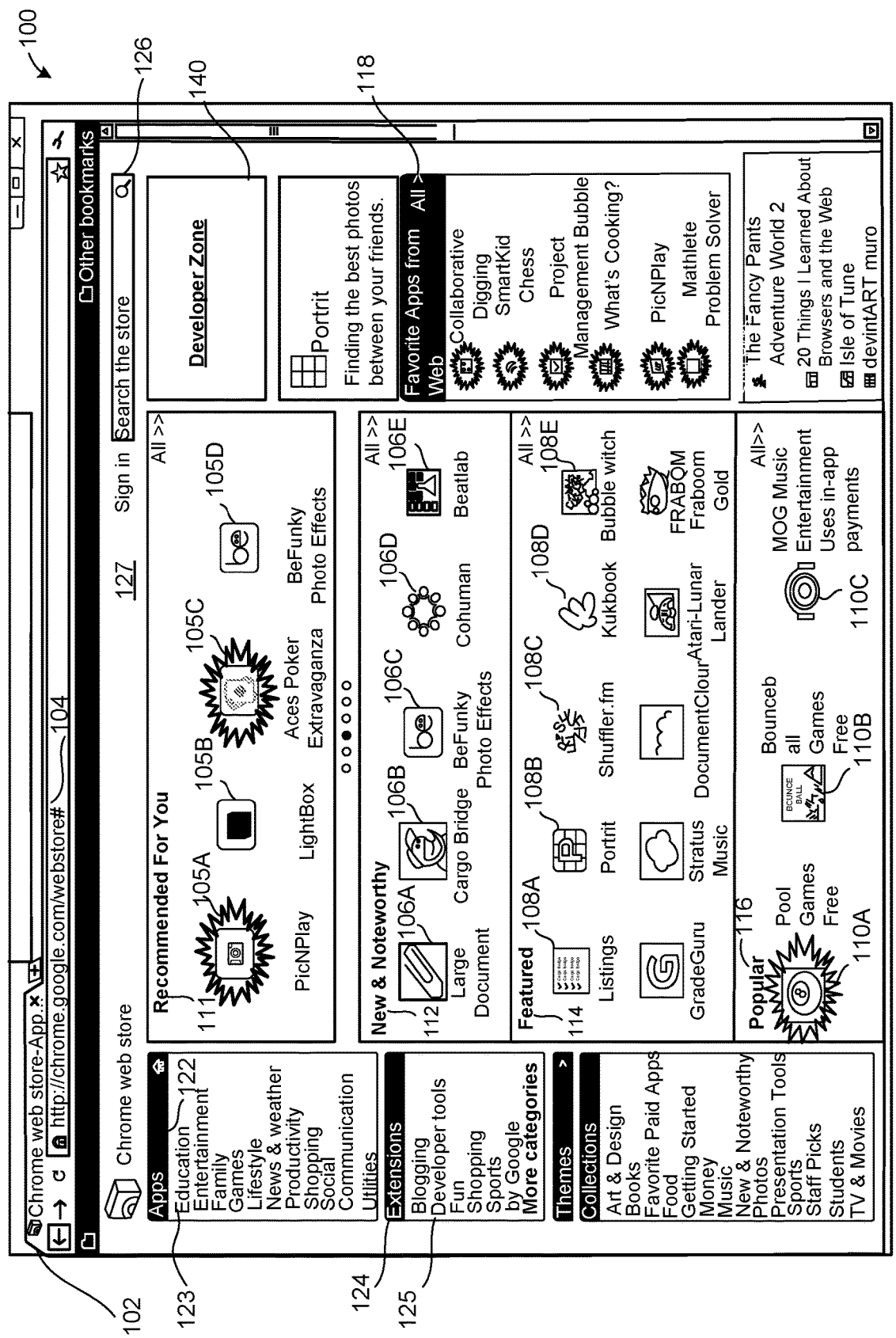
FIG. 1 is a screenshot of the user interface to a marketplace of digital goods.

This disclosure generally describes discovering content that can be packaged for consumption in a marketplace of digital goods. Example content can include documents, applications (e.g., "apps" or "web apps"), extensions, themes, executable files, audio files, video files, images, browser-integrated websites, hosted web applications, programmatic code, and/or metadata pertaining to any of the above-described content. In general, the content be used to provide users entertainment, services, connectivity, and/or productivity access. Such content can be configured for rendering as a selectable digital good (e.g., an application) in an online marketplace for digital goods.

As used herein, a packaged application may refer to an application that includes a collection of code that is downloaded to a user's local device for local execution. As used herein, a hosted application may refer to an application that is hosted on a server and remotely executed for a user. As used herein, a web app or web application may refer to a website that is executed by a browser and navigated to by a user accessing the Internet. The systems and methods described below can collect information related to a web app or web application and provide a selectable application in the online marketplace in which the selectable application is configured to function similar to a native application for a particular platform.

In general, the marketplace may represent a website or collection of websites functioning as an online storefront in which users can browse for content/digital goods. The storefront can be configured to help users find, purchase, configure, and install digital goods and content for execution in a web browser. Digital goods can be owned by entities represented by developers, companies, or other third party users of the marketplace. In some implementations, the digital goods are packaged and/or provided by the developers of the marketplace rather than a third party entity.

Since the Internet is full of interesting applications that are not currently listed in the marketplace, it would be advantageous to provide a way to integrate such applications and related content into the marketplace in an automated fashion. Accordingly, the systems and methods described in this disclosure can be configured to peruse document inventory available on the Internet to obtain web applications and other content that can be configured for user consumption and listed as part of the marketplace.

In a non-limiting example, content obtained from the online inventory can be reviewed by the systems described herein to determine whether the content would provide useful access to users of the marketplace. For example, the systems can analyze website traffic and user behavior associated with a specific website in the inventory in order to determine whether the website provides an application that can be categorized similar to other applications listed in the marketplace. In this fashion, the systems can determine whether the specific website would be a resource that users of the marketplace might be interested in.

In some implementations, the online inventory can be reviewed by the systems in order to curate particular types of applications from the Internet (e.g., web applications) for listing in the marketplace. For example, the systems described herein can retrieve metadata including one or more of a URL, a title, a description, a category, an owner name or hostname related to a website or content in a corresponding web application, and or image content.

The systems can use the retrieved metadata or other retrieved data associated with each particular web application to define a number of metrics for the web application. The metrics can be used to determine user interactions with the web application that may provide an indication about web application usage, search result interactions, and/or click activities.

In some implementations, the systems described herein can perform tasks to ensure web applications are properly selected and listed in the marketplace. One such example includes proofreading content associated with the web application and correcting detected errors or communicating with developers to correct the detected errors. In addition, the systems described in this disclosure can determine how to package or provide the web applications as digital goods that can be placed in the marketplace.

In general, the digital goods can be placed (e.g., uploaded manually or automatically) in the marketplace by a service provider, a developer or owner of particular digital content, or the marketplace owner. In the event that a service provider or developer owns and uploads the digital goods, the owner and/or service provider can choose to modify, delete, or otherwise configure the uploaded goods. The uploaded digital goods may represent content to execute the digital good as an application running in a web browser and functioning as a marketplace-listed application. The digital goods can be uploaded alongside metadata, images, title information, or other descriptive content pertaining to the goods. In some implementations, the digital goods are packaged with the metadata, images, title information, or other descriptive content pertaining to the goods. Each digital good may be associated with an icon, a website, and/or other information to ensure the digital good appears as a packaged application that can be installable locally to function as if it were a native application in a browser of a user's local computing device. The icon may be displayed in the marketplace and function as a pointer the digital good location on the Internet (i.e., the website of the discovered web application).

In the event that an automatic process uploads the goods, the marketplace can automatically discover web applications, access particular details about the web applications, and configure the application to generate an application listing in the marketplace. The marketplace can ask permission to provide such content in the marketplace and can provide content owners a way to ensure that the goods are updated, accurate, and correctly listed in the marketplace by offering notices, websites, or other communications to particular owners of the goods. In this fashion, an owner can oversee her content in the marketplace while allowing the marketplace to provide an outlet for users to access the owner's goods. In some implementations, an email or other communication can be sent to an owner/developer of particular digital goods providing instructions for inserting a metadata tag into the application code in order to allow the marketplace permission to upload the owner's goods.

The process to include digital goods automatically in the marketplace can include a number of steps to discover, ascertain, and configure the goods for user consumption. The automatic process can be performed by one or more servers configured to seek out websites that provide application-like functionality or content. The term "application-like content" may pertain to web pages or websites that include executable web applications (e.g., "web apps") that are hosted on a particular URL and determined to provide executable web applications that may offer functionality that is exposed as a service, game, or productivity implementation that can be accessed in a web browser.

As part of the automatic process, the systems described below can access or utilize one or more servers to analyze a set of web pages to search for the application-like websites amongst a variety of website types. For example, the one or more servers can include a number of search servers performing a web crawl of the set of web pages. These search servers can be configured to obtain data, metadata, image data, or other data from each page crawled, but can be particularly configured to analyze whether or not any of the websites provide application-like functionality.

In some implementations, obtaining data from such application-like websites can be performed in a manual fashion by receiving the data directly from a developer or alternatively, by receiving website entries from a marketplace owner, for example. In some implementations, the application-like websites can be obtained using a combination of manual and automatic processes.

In one example, digital goods and related content can be obtained from information gathered in a web crawl. For example, a web crawl can be performed by one of the servers in the systems described below to gather content pertaining to data, metadata, image data, or other data from a number of web sites. In general, the web crawl can include systemically browsing portions of the Internet to search and index content. The web crawl can be performed by a search server or other server and may or may not be related to requests received from servers that house content in the marketplace. The systems described below can use the crawled data to find content for the marketplace. For example, systems described below can search within crawl data to find metadata associated with web applications provided in a web space. The metadata and related content found in the web crawl can be used to package or otherwise provide the web applications for display in the marketplace alongside other applications in the marketplace.

The "web space" may include a portion of the Internet provided to a website owner to upload and/or configure web applications or web pages that house the web applications. In some implementations, a web space may include online storage space associated with a particular web hosting service. In some implementations, a web space can define a web crawl space that may represent the entire Internet or some portion of the Internet. In general, a web search engine can be used to sift through content in the web crawl space.

In some implementations, the systems described below can collect web crawl data by accessing data gathered from a search server and reuse the data to generate an application for the marketplace. Example data that can be used to generate the application can include data and metadata related to a title, a snippet, or a rich snippet corresponding to the web application.

The systems and methods described in this disclosure can be configured to obtain application-like web content, package or provide the content as an application that can be displayed in the marketplace. The displayed application can include a title, an icon, a URL, or other content associated with the application-like web content/web application that it originated from. The information used in the displayed application may not be exact content included in the original web application. For example, the systems described herein may modify the content for the marketplace. Modifications can include, but are not limited to title changes, application functions, icon or graphic image changes, and/or accessibility changes.

In some implementations, the systems described in this disclosure can be used by marketplace personnel to manually gather and insert or enter particular websites that house web applications. These manually entered websites can be used by the marketplace systems or personnel to generate an application for display in the marketplace using content available at the website link. Such applications can be provided in the marketplace storefront.

Referring to FIG. 1, a screenshot 100 is depicted of a user interface to a marketplace of digital goods. The user interface 100 can be displayed by a browser application that is executed by a computing device that may be connected to a network (e.g., the Internet). The browser application can open one or more tabs 102, one of which may display the user interface to the marketplace when a user navigates to a web page identified by a uniform resource locator (URL) 104 that provides content to the browser so that the browser can display the user interface to the marketplace in the tab.

The content provided by the web page to the user can include a plurality of icons 105A, 105B, 105C, 105D, 106A, 106B, 106C, 106D, 106E, 108A, 108B, 108C, 108D, 108E, 110A, 110B, 110C that represent digital goods that can be downloaded from the web page by the user for execution by a computing device controlled by the user.

Within the user interface 100, the applications can be displayed in a manner that is organized to help a user decide which applications may be useful or relevant to the user. For example, the user interface 100 can include a category 111 of applications 105A, 105B, 105C, and 105D that have been recommend for the user. In this example, the "PicNPlay" application 105A and the "Aces Poker Extravaganza" application 105C are both shown with a burst symbol around the icon. The burst symbol can be one example way to indicate that the applications (i.e., 105A and 105C) relate to application content that has been automatically identified, packaged, and uploaded to the marketplace by servers associated with the marketplace. By contrast, applications that do not include the burst symbol can indicate applications (e.g., 105B and 105D) related to application content that has provided directly from a developer and/or approved by the developer and the marketplace for display. In some implementations, the burst symbol can remain on an application that is developer-approved in the event that the developer prefers to allow continued automated updates to be performed to her application.

In another example, the user interface 100 can include a category 112 of applications 106A, 106B, 106C, 106D, 106E, 106F that have been recently released in the marketplace and which a curator of the marketplace may deem to be especially noteworthy to users. In general, the applications 106A, 106B, 106C, 106D, 106E shown in the New and Noteworthy category 112 of the user interface 100 can be a subset of a larger number of applications that also could qualify as being new and noteworthy but which have not been selected for display in the user interface 100.

In another example, the user interface 100 can include a category 114 of applications 108A, 108B, 108C, 108D, 108E that have been selected to be featured for display. The applications 108A, 108B, 108C, 108D, 108E that are selected to be featured in the category 114 can be selected based on criteria evaluated by a curator of the market place. For example, the curator may select the applications 108A, 108B, 108C, 108D, 108E for display in the category 114 from a much larger set of applications based on the curator's opinion of the quality, popularity, or utility of the selected applications. In another implementation, the curator may select the applications 108A, 108B, 108C, 108D, 108E based upon payments made by developers of the applications in return for prominent display of the applications in the user interface 100.

In another example, the user interface 100 can include a category 116 of applications 110A, 110B, 110C that have been selected for display in the category 116 of the user interface 100 based on a popularity ranking of the selected applications relative to other applications. The popularity ranking can be determined based on reviews of the applications by users who have downloaded and used the applications. For example, the marketplace may request that users rate applications quantitatively using a system of one to five stars, where five stars is the highest rating, and one star is the lowest rating. As shown in category 116, the "Pool Games Free" application 110A includes a burst symbol around the icon and as such, the burst symbol indicates that the application 110A pertains to an automatically discovered and uploaded application.

The user interface 100 of the marketplace also can include categories of applications in other sub-portions of the user interface 100 in which smaller icons are used to represent the applications that are used in categories 112, 114, 116. For example, category 118 can display "Favorite Apps from the Web," which can be applications that have been automatically crawled, discovered, and repackaged or uploaded to the marketplace. These applications may represent web applications that have been configured for the marketplace to allow a user to go into the marketplace, select and install the application (in a browser launch bar, for example), and have the ability to launch the application in a browser configured to run the application.

Within the user interface 100, categories 112, 114, 116, and 118 can display a subset of applications that are categorized to fall within the category. Because screen space within the user interface is limited, only a subset of the applications that fall within a category may be displayed within the user interface 100. However, by selecting a hyperlink associated with the category, more applications that fall within the category can be displayed to a user. For example, each category 112, 114, 116, and 118 is associated with a hyperlink labeled "All," the selection of which may cause more applications that fall within the category to be displayed.

Other parts of the user interface 100 also can be used to organize the digital goods that are available in the marketplace. For example, an "Apps" section 122 can provide a list of hyperlinks, which each can be selected to display applications that belong to a category identified by the hyperlink. For example, selection of the "Education" hyperlink 123 can cause a group of icons that represent applications related to educational topics to be displayed. In another example, an "Extensions" section 124 can provide a list of hyperlinks, each of which can be selected to display an extension that belongs to a category identified by the hyperlink, where an extension is executable code that extends the functionality of a browser. For example, selection of the "Sports" hyperlink 125 can cause a group of icons that represent extensions related to sports topics to be displayed.

In addition to locating digital goods (e.g., Web applications and extensions) that are already displayed within a category 112, 114, 116, and 118 of the user interface 100, additional content related to the category could be displayed as a result of selecting a corresponding "All" hyperlink. In addition, digital goods can be located because of a query for goods that may be of interest to the user. For example, a user may enter query terms into an query box 126 that may receive the query terms and pass the terms onto a search engine that then locates digital goods that match the query terms and that are available in the marketplace. For example, digital goods such as web applications can have a variety of metadata associated with them that are used to index the digital goods, and the query terms can be compared to the metadata associated with the digital goods. Based on the comparison, applications that best match the query terms can be selected from the digital goods available in the marketplace, and the selected goods can be presented to the user in the user interface 100.

The user interface 100 also includes a hyperlink 127 that can be selected so that the user can log into the marketplace. For example, selection of the hyperlink 127 can trigger the display of a prompt to the user to enter a username and password, and successful entry of the username and password may allow the user to log into a personal account associated the marketplace. Once the user is logged into the marketplace, digital goods can be selected and presented to the user within the user interface 100, where the selection of the goods can be personalized to the user based on data associated with the user's account.

The user interface 100 also includes a developer zone hyperlink 140 in which users can enter to access, modify, maintain, or upload digital goods/content in the marketplace. For example, users can select the developer zone hyperlink 140 to manually upload their own web application and the marketplace can generate an icon to be associated with an application using the uploaded content (e.g., metadata, URL, images, title, description, application features, etc.) associated with the user's web application.

In some implementations, a content owner or application developer can include information that may enable a web crawl engine associated with the marketplace to recognize application content. For example, the developer can use structured data markup to annotate her web applications. Structured data markup can include code that signifies specific permissions, rich snippets, breadcrumbs, and/or particular search boxes, that correspond to the application. A web crawl engine, such as crawling engine 264, can infer information about the underlying application by using the structured data markup. In one example, when a developer provides her web application on her website and includes this structured data markup, search engines can use the structured data markup to index the content in the application. The application can be indexed by such a search engine in order to make the application and any corresponding content recognizable by computing devices in an automated fashion. The indexed content can be used by crawling engine 264, for example, to search for and classify application content that may be considered for the marketplace.

Figure 2:
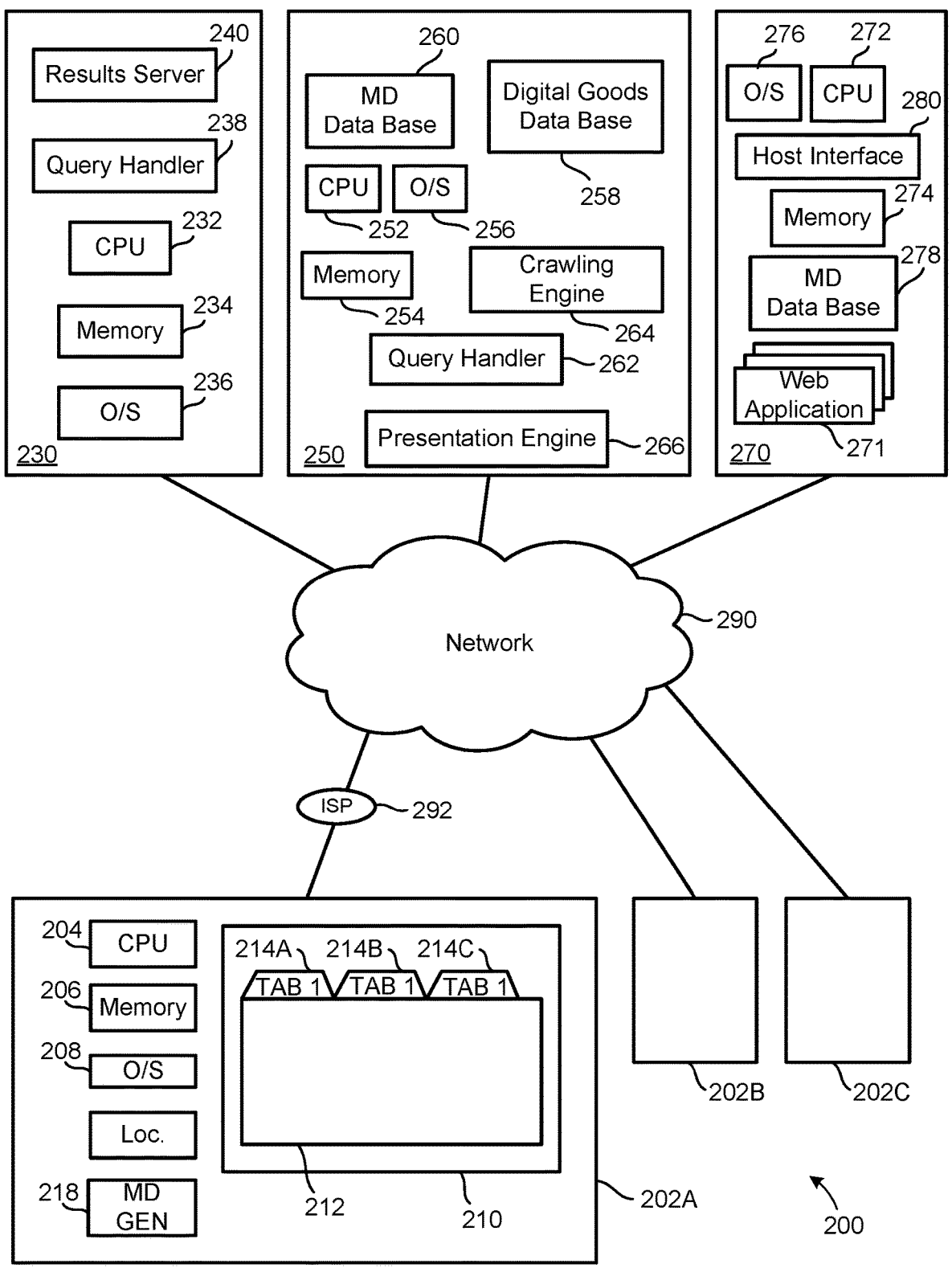
FIG. 2 is a schematic diagram of a system for automatically crawling content on the web.

FIG. 2 is a schematic diagram of a system 200 for automatically crawling content on the web and configuring portions of the content for upload in an online marketplace. In short, the system 200 can generate criteria for a plurality of web applications in an online marketplace, translate the criteria into rules that can be used to compare to predefined categories defined by the online marketplace. The system 200 can additionally obtain metadata associated with a plurality of websites by crawling the websites and can determine using the metadata and at least one rule, whether any of the websites includes code that executes a feature associated with the at least one rule. In addition, system 200 can determine that at least one website includes code that executes the feature associated with the at least one rule and obtain content associated with the website. Upon obtaining the content, the system 200 can generate an icon for the website. The icon and content may be configured for placement as a selectable listing in the online marketplace and can be displayed as such.

In some implementations, the system 200 can determine whether particular websites include particular features by detecting a permissions sequence in the executable code associated with the features. For example, the system 200 may detect a permission declaration, syntax, key phrase, or code sequence in executable code associated with a particular feature in order to determine whether the executable code represents content/web application content that can be displayed in the online marketplace. In the event that the system 200 detects such a feature, the system 200 can compare the content/web application that contains the feature to predefined categorical information associated with the online marketplace. The comparison can be used to determine whether the content/web application would be a favorable addition to the online marketplace. The comparison can also be used to determine whether the content/web application represents duplicate content in the marketplace.

In this manner, the system 200 can crawl, analyze, and compare in an effort to apply a series of filters in order to determine whether particular content/web applications would be a favorable fit for the marketplace. In one nonlimiting example, the system 200 can first search for terms in the executable code that mention known browser permission sequences and as such can infer that such code would suggest that the content pertains to a web application. Next, the system 200 can search for executable code segments in the file and if detected, the segments can be compared to existing web applications in the marketplace and/or categorical information associated with the application in the marketplace.

Referring to FIG. 2, the system 200 may include client computing devices (e.g., desktop computers, notebook computers, netbook computers, tablet computers, smart-phone, etc.) 202A, 202B, 202C. A client computing device 202A can include one or more processors 204 and one or more memories 206. The client computing device 202A can execute an operating system 208 and one or more applications, such as application 210, which may display a user interface window 212.

In one embodiment, the client computing device 202A may be running or causing the operating system 208 to execute an application 210 or window 212. For purposes of illustration, the window 212 is referred to as a web browser. However, it is understood that the above is merely one illustrative example to which the disclosed subject matter is not limited. In various embodiments, this window 212 may include a plurality of panes or tabs 214A, 214B, 214C. The window 212 can be a visual area, containing some kind of user interface. In a graphical user interface (GUI) used in the client device 202A, the window 212 can be a two-dimensional object arranged on a plane of the GUI known as the desktop. The window 212 can include other graphical objects, e.g., a menu-bar, toolbars, controls, icons and usually a working area in which the document, image, folder contents or other main object can be displayed. The working area may be capable of holding only one main object (i.e., in a single document interface) or more than one main object in a multiple document interface. In some applications, specifically web browsers, multiple documents can be displayed in individual tabs 214A, 214B, 214C. These tabs 214A, 214B, 214C are typically displayed one at a time, and are selectable via a tab-bar, which often resides above the contents of an individual window. That is, one selected tab 214A is "forward-facing" and displays information or content to a user in the window 212, with the content of other tabs 214B, 214C is "hidden."

The client computing devices 202A, 202B, 202C may receive digital goods/online content from one or more server computing devices 230, 250, 270, that may be connected to the client device 202A-C through a network 290. Each of the client computing devices 202A, 202B, 202C can be connected to the network 290 through a local Internet Service Provider 292. The received online content can be processed and displayed in the window 212 (e.g., in a on a tab 214 of the window 212). For example, the window 212 can display a user interface of a marketplace for digital goods, similar to the user interface of the marketplace described herein, to a user. A user can interact with the displayed content, and an activity metadata generator 218 can monitor the user's interactions with the content and the performance of the application 210 and can generate activity metadata based on the user's interactions with the content and based on the performance of the application 210.

In some implementations, the digital goods can include applications that can be downloaded from the marketplace to the client computing device 202A where they can be provided for execution by a browser running on the computing device. Such applications can be known as "installable web applications" because their code is downloadable from the Internet (i.e., World Wide Web), and stored in a local memory 206 from which it can be fetched for executing by a locally-executing browser.

In some implementations, the client computing device 202A can include a location detector 218, which may automatically detect a location of the computing device, for example, based on global positioning system (GPS) signals, or by triangulation of signals from transmitters at known locations, or by using other hardware and/or techniques. In some implementations, a location of the client computing device 202A can be determined based on a location associated with the ISP 292. For example, a known location of the ISP can be used as an approximation or as a proxy for the location of the client computing device 202A.

The client computing device 202A can communicate with the server 250, which may represent a digital goods marketplace server 250 that provides a marketplace for digital goods to client computing devices 202A, 202B, 202C. The marketplace server 250 can include one or more processors 252 and one or more memories 254. The marketplace server 250 can execute an operating system 256 and various applications and services to provide functionality to the client computing devices. For example, in one implementation, the marketplace server 250 can include a repository for database of digital goods 258, and the digital goods can be served from, or downloaded from, the repository to the client computing devices.

In another implementation, the digital goods can be stored in, and served to client computing devices from, a repository that is remotely located from the marketplace server 250. For example, digital goods could be stored and served to client computing devices from individual repositories that are operated and controlled by developers of the digital goods, and digital goods repository 258 of the marketplace server 250 can provide just a reference to the individual repositories that are operated by the developers.

In some implementations, the marketplace server 250 (or another server) can retrieve web applications and website content for storage in digital goods repository 258. A number of algorithms can be used to determine which web applications to retrieve. Example algorithms are described in detail below.

The marketplace server 250 can include a metadata repository 260 that stores metadata associated with the digital goods that are available from or referenced by the digital goods repository 258. The metadata associated with a digital good can include a variety of information about the digital good. Such information can include, for example, representative keywords associated with the digital goods, the price associated with the digital goods, titles, names, or snippets associated with content and/or locations where an original version of the digital goods may have been obtained. For example, in the event that the system 200 crawled a website that provided a particular digital good, then the metadata collected and stored with that good may pertain to the hostname and URL in which the good was uploaded.

In some implementations, the metadata may also include demographic data about targeted users of the digital good, a time of year month or day during which the digital goods may be of the highest interest to a user, etc. For example, metadata associated with the surfing videogame may indicate that the good is intended for use by male users between the ages of 15 and 34, who live in coastal California or Hawaii, and that the game may be more popular during summer months than during winter months.

The marketplace server 250 can include query handler 262 that can be configured to receive and process queries for digital goods available in the marketplace. For example, the query handler can receive queries for digital goods that are entered into query box 127 of the user interface 100 shown in FIG. 1. Terms or phrases of the queries then can be compared to terms and phrases (e.g., terms and phrases stored in the metadata repository 260) that are used to index the digital goods available in the marketplace. Based on the comparison, a subset of digital goods can be selected from the database 258 with which to respond to the query.

The marketplace server 250 can include a crawling engine 264 that is configured to crawl the web for digital goods based on automated requests from the marketplace server 250, for example. In some implementations, the marketplace server 250 may periodically, and without receiving a request from a user execute a web crawl to retrieve additional content pertaining to a particular web application. For example, the marketplace can perform a web crawl with the purpose of finding up to date content for its applications. If additional content is discovered, the marketplace server 250 can generate, from the additional content and the currently listed application, an updated application listing, which can be used to replace an older version of the application listed in the marketplace.

The crawling engine 264 can be configured to crawl all or a portion of the World Wide Web. For example, the crawling engine 264 can perform a web crawl to gather content pertaining to data, metadata, image data, or other data from a number of websites. In general, the web crawl can systemically browse portions of the Internet to search and index such content. The web crawl can be performed by a search server or other server and may or may not be related to requests received from servers hosting the marketplace. The crawling engine 264 can provide the crawled data to one or more of servers 230, 250, or 270 in order to allow for one of the servers to detect content that would be appropriate for inclusion in the marketplace. For example, systems described below can search within crawl data to find metadata associated with web applications provided in a web space. Any metadata or related content found in the web crawl can be used to package web applications and display the packaged web applications in the marketplace alongside other apps or applications in the marketplace.

The marketplace 250 can include a presentation engine 266 that prepares information for transmission to the client computing devices 202A, 202B, 202C, where the information is used by the client computing devices to display a user interface 100 that shows representations of selected digital goods available in the marketplace. For example, based on the output of the crawling engine 264, the presentation engine 266 can prepare HTML code, XML code, etc. that determines the information that is displayed to a user in the user interface 100 and where the code determines which digital goods will be displayed to the user in the user interface 100.

The information that is provided by an application 210 running on a client device to the marketplace server 250 (e.g., regarding how a web application is launched, how often the user interacts with a web application, how often a web application crashes, etc.) can be provided on an opt-in basis. In other words, such information may be provided from the client computing device 202A to the server 250 only if the user of the client device specifically authorizes the transmission of such information from the client to the server.

As shown in FIG. 2, the system 200 can include a search engine server 230 that includes one or more processors 232, one or more memories 234, an operating system 236, a query handler 238, and a result server 240. The query handler 238 can receive queries that include one or more query terms or query phrases from client computing devices 202A, 202B, 202C, and a result server 240 can provide search results in response to the queries. The search engine server 230 can monitor the query terms and phrases received from client devices, and based on the query term traffic the search engine server 230 can generate statistics about trends in users' interests. For example, when a previously-unknown singer becomes a star entertainer, trends in query term traffic may reveal that users are becoming more interested in discovering information about the singer. Similarly, when a movie or a game becomes popular, trends in the search engine traffic received to the search engine server 230 can automatically reveal the increase in the popularity.

As shown in FIG. 2, the system 200 includes a web application server 270 that can identify a number of web applications 271 from content collected in a crawl performed by server 250, for example. In some implementations, the web application server 270 can perform additional web crawls to obtain additional data (similar to the web crawls discussed with respect to marketplace server 250 above). In some implementations, web application server 270 can reuse previously crawled data, such as metadata obtained by a search engine or a crawling engine (e.g., search engine server 230 or crawling engine 264).

As shown, the web application server 270 includes one or more processors 272, one or more memories 274, an operating system 276, a metadata ("MD") data base 278, and a host interface 280. The web application server 270 can be configured to analyze collected web application data in order to configure such data into individual web applications for presentation in the marketplace.

The metadata repository 278 may store metadata associated with the collected web application data. The collected web application data may be obtained by marketplace server 250, which can store a duplicate or a portion of the collected metadata in its own metadata repository 260. The metadata stored in repository 278 can be used to compare to any subsequent web crawl data to original web crawl data gathered for a particular website. In general, the repository 278 can be configured to store metadata for websites that are deemed to include marketable applications or application-like content marketable in the marketplace.

Figure 3:
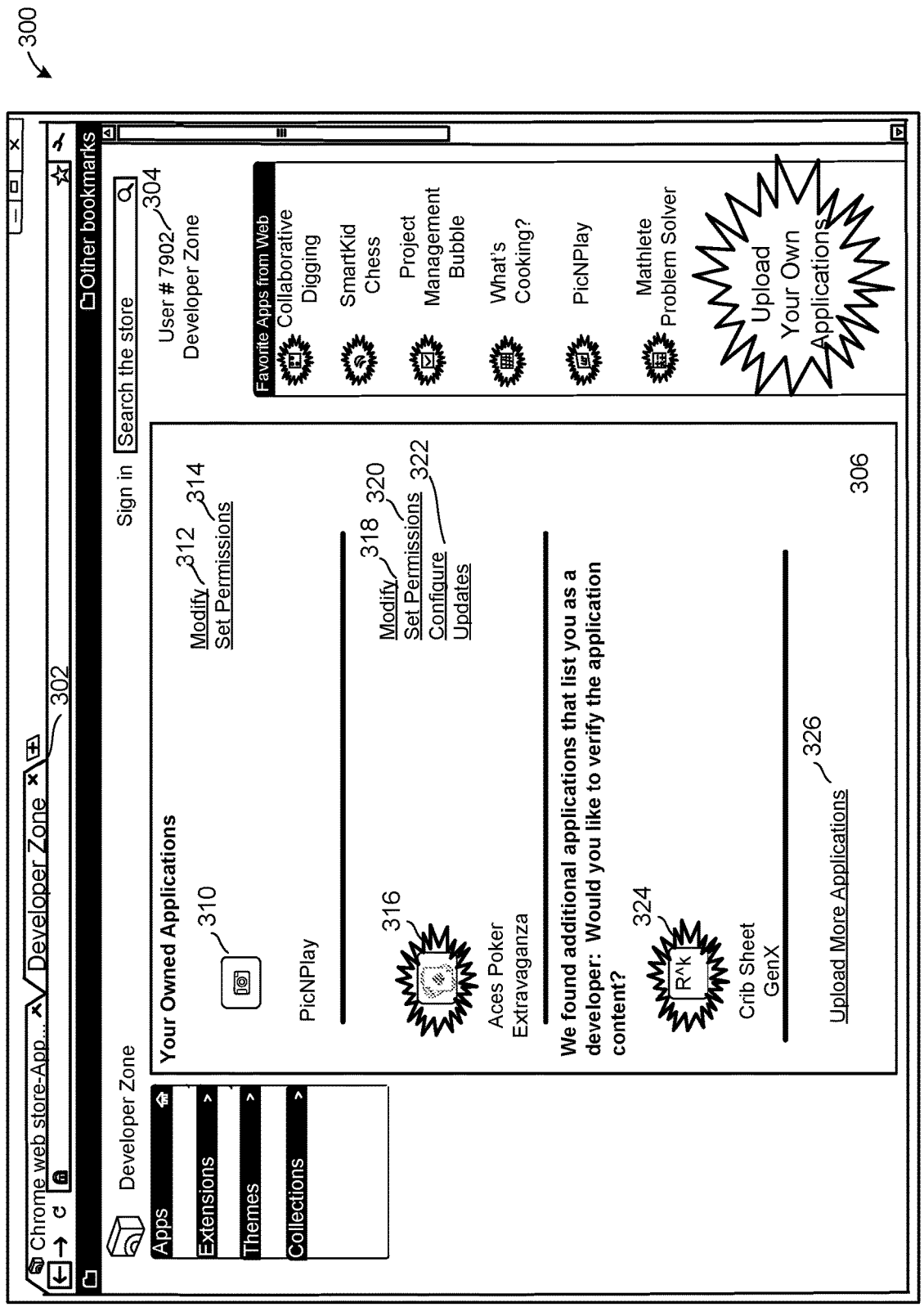
FIG. 3 is a screenshot of the user interface to a developer area of a marketplace of digital goods.

The host interface 280 may be synonymous with the developer zone shown in FIG. 1 at 140 and in FIG. 3 at 300. This interface can be used by developers or content hosts in order to update, modify, and configure content that they own and wish to have displayed in the marketplace.

In various embodiments, application 210 may be a web browser configured to access a website or a collection of web pages, scripts, etc. from a physically remote server or web server (e.g., servers 230, 250, or 270, etc.). In some embodiments, the web browser may be included as one of the native applications 210, as a portion of the operating system 208, or accessed from server 270 as a web application 271.

In various embodiments, the application 210 may include or be configured to interact with one or more browser extensions (not shown). In this context, a "browser extension" may include one or more web pages packaged or grouped together as a definable whole, and configured to add functionality to the application 210. In one embodiment, a browser extension may add functionality by altering the way a web page or website is displayed or rendered by the application 210 (e.g., by blocking advertisements, adding hyperlinks, etc.). In another embodiment, the browser extension may add functionality by communicating with a server (e.g., server 250) and updating or altering the user interface (UI) of the application 210 (e.g., placing or changing an icon in the application 210 toolbar, etc.). It is understood that the above are merely a few illustrative examples to which the disclosed subject matter is not limited.

In this context, application 210 may be a web page in which the "web page" may include a file or document which is a portion of a website. In various embodiments, such web pages may include a file formatted as Hypertext Markup Language (HTML), Cascading Style Sheets (CSS), JavaScript, Extensible Markup Language (XML) such as a XHTML (Extensible HyperText Markup Language) file, an Adobe Flash file, images, videos, etc. In various embodiments, the application 210 may process one or more web pages in order to render one web page. For example, an HTML web page may be modified or include other web pages, such as, JavaScripts, a CSS file, various images, etc. It is understood that the above is merely one illustrative example to which the disclosed subject matter is not limited.

In this context, a "website" may include a collection or grouping of related web pages that are generally viewable or understandable (once rendered by the application 210) to a user. In various embodiments, when a website is accessed via a communications network, the website may be accessed via the Hypertext Transfer Protocol (HTTP) or Hypertext Transfer Protocol Secure (HTTPS). It is understood that the above is merely one illustrative example to which the disclosed subject matter is not limited.

In various embodiments, the web browser may include or be associated with one or more web applications. In this context, a "web application" may include at least a portion of a website which itself includes web pages. In this context, a "web application" may be configured to help a user, via a website of the web application 210, for example, complete a single task or multiple tasks. In such an embodiment, the web application 210 may be configured to be executed or interpreted by the web browser. This is compared with the native applications that include machine executable code and are configured to be executed directly by the processor or via the operating system, whereas, a web application 210 may be incapable of execution or display without the aid of the web browser.

In the illustrated embodiment, the web browser extension may be packaged as an installable entity. In this context, "installation" includes the act of placing semi-permanently or substantially permanently one or more files (e.g., manifests, web pages, etc.) on the computing device 202A for later execution or processing.

In such an embodiment, a user, via the application/web browser 210, may contact the marketplace server 250, which includes or provides a web store/online marketplace hosting digital goods repository 258, for example. In various embodiments, the online marketplace may include one or more browser extensions for download and installation. Each of these browser extensions may be packaged as an installable entity in a predetermined format (e.g., Chrome Extension format (CRX), ZIP format, etc.).

The information that is provided by an application 210 running on a client device to the marketplace server 250 (e.g., regarding a user's browsing history, click behavior, etc.) can be provided on an opt-in basis. In other words, such information may be provided from the client computing device 202A to the server 250 only if the user of the client device specifically authorizes the transmission of such information from the client to the server.

FIG. 3 is a screenshot of the user interface 300 to a developer area of a marketplace of digital goods. Here, a user may have selected the developer zone hyperlink 140 (FIG. 1) to enter an area to upload or modify goods and associated content that was originated by the user. In some implementations, the developer zone is configured for developers to upload new content to the marketplace. In other implementations, the developer zone is an area in which developers can be directed to if, for example, system 200 notifies the developer that one of his applications has been automatically selected for upload to the marketplace. In some implementations, the developer zone 300 represents both an area to upload new content and an area to verify or provide permission to upload automatically detected/crawled content.

In some implementations, the developer zone 300 can be used by a developer to access settings regarding her uploaded content. For example, a developer may want to change or update names, images, or functionality of her application and can do so by manually uploading changed content, metadata, etc. and requesting that the marketplace repackage the application with the uploaded changes. In another example, the developer zone 300 may provide automated options where a developer can check a number of options to have the marketplace servers evaluate on a time incremented basis whether new or modified content is available at the developer's hosted website. The marketplace servers can then perform additional web crawls back to the developer's site according to a user-entered maintenance schedule. If the crawl determines that changes have been made between the developer's site and the packaged application in the marketplace, the systems described in this disclosure can automatically update the marketplace application with the changes or alternatively, can be set to notify the developer to request permission, notify the developer of changes that will be made on a certain date, or to notify post-change regarding changes that have been implemented to the application. These items can be configured by the developer in the developer zone 300.

As shown in FIG. 3, a user has entered the developer zone 300, which has opened up a developer zone tab 302. It is likely that the user was presented a login page (not shown) to get to the developer zone 300. In this example, the user is presented with a user number 304 assigned to her by the system 200. The user number is simply an indicator of an account associated with the developer and as such, could be instead a username, an email, or other selected or assigned user identifier.

In the example, a developer (i.e., user 7902) is shown an application area 306, a "favorite apps from the web" area 308, and additional selectable links similar to those described in FIG. 1 (shown here in a collapsed mode). The application area 306 includes a "PicNPlay" app 310. The app 310 may be a photo app that the user/developer developed and uploaded to the marketplace. The app 310 may be associated with a number of links to allow the user to configure the app 310 or associated services related to the app 310. For example, a modify link 312 is included so that the user can be provided a way to modify images, content, functionality, or other information related to the app 310. In addition, a permissions link 314 is included so that the user can set and/or associate the app 310 with particular permissions. For example, the user can enable or disable system-generated modifications to the app 310. In another example, the user can use the permissions link 314 to determine which types of users can have access to the app 314, or to allow full public view and usage of the app 314.

As shown in FIG. 3, the user 7902 is presented with an additional application named "Aces Poker Extravaganza" 316. App 316 includes a burst symbol and as described above, the burst symbol may indicate that this application may have originated in the marketplace/storefront from an automatic web crawl which found the app 316 and packaged it for the marketplace. While app 310 may have been uploaded by the user, the app 316 is notated with the burst to indicate that it was not originally uploaded to the marketplace by the user, but was discovered and uploaded automatically by the system. Additional steps may have occurred in order to publically display such an automatically discovered app, such as requesting user permission, etc. Here, the links associated with the automatically discovered app 316 include a modify link 318 and a set permissions link 320 (similar to the links for app 310). However, the automatically discovered app 316 includes a configure updates link 322 that can be used to enable or disable automatically crawled updates to be applied to the app 316. In some implementations the configure updates link 322 can include a setting for configuring a schedule for automatically maintaining the information in the app 316. Other links and configurations for the apps displayed in developer zone 300 are possible.

As shown in FIG. 3, the user 7902 is presented with a section of additional applications in which a developer may be an author for, but may not have provided permissions to display this content in the marketplace. Here, the additional app is a "Crib Sheet GenX" app 324 for generating crib sheets. Since the app 324 includes the burst symbol, the system 200 may have automatically discovered the app and may have identified a user as a known developer of apps for the marketplace. Here, the developer zone 300 shows text that indicates "We found additional applications that list you as a developer: Would you like to verify the application content?" This can trigger the user to select app 324 and provide additional details and/or permissions.

Discovering that the app 324 belongs to a known system user allowed the system 200 to upload the application content from a developer's host site, configure an application for the app 324 and display the configured application in the developer zone 300 to allow the developer to approve, deny, modify, or otherwise modify the application before the marketplace provides it to the public. Although, the app 324 is shown in a graphical user interface associated with the marketplace, other communications may have occurred regarding asking the developer for permission to upload or configure the app 324.

In operation of system 200, the app 324 may have been a newly generated app with unclaimed ownership. The system 200 may have determined knowledge regarding the owner. For example, here, the system 200 determined that user 7902 has an association to app 324 and in response, the system 200 configured the application to display in zone 300 the next time the user 7902 logged in to, or accessed, the marketplace.

In the event that the user logs into the marketplace and accesses the developer zone 300, the user can be presented with the option to verify any outstanding applications. For example, here the user can be presented with app 324 and may choose to claim the app 324. Claiming the app 324 can trigger the system 200 to convert the app into a marketplace application and the app 324 from that point behave like any other application in the marketplace. In some implementations, when a developer claims an application, then the system 200 can convert the application into a standard marketplace application (i.e., no burst symbol) and the application may be configured to forego automatic updates in the future with new information, screen shots, etc. In some implementations, the owner can claim the app and continue to allow automatic updates to occur.

In some implementations, an owner may wish for an app to be removed from the system. Accordingly, the system 200 can remove the app from the developer zone and mark the data with an indication to never display the application in an automatic discovery task. That is, since the site owner is not content with having their app in the marketplace, the system 200 can ensure that the removed app is not presented as a candidate for creating a new app again by automatic crawling or by other automated means.

The "favorite apps from the web" area 308 represents applications that have been automatically uploaded for the marketplace by system 200, for example. Similar to the same section in FIG. 1, the applications in area 308 can include applications that have been automatically crawled, discovered, repackaged, and uploaded to the marketplace. In some implementations, the apps in area 308 may pertain to apps in which the owners have determined to continue allowing automatic discovery of any changes to their content. This may be convenient for an owner/developer who wishes to have their latest and greatest versions available in the marketplace, but who do not wish to spend the time uploading new content and organizing or configuring application content in multiple store interfaces.

The developer zone 300 includes a link 326 so that the user can upload additional applications in a guided and manual fashion. In general, developers can access this link from a number of places within the marketplace.

Figure 4:
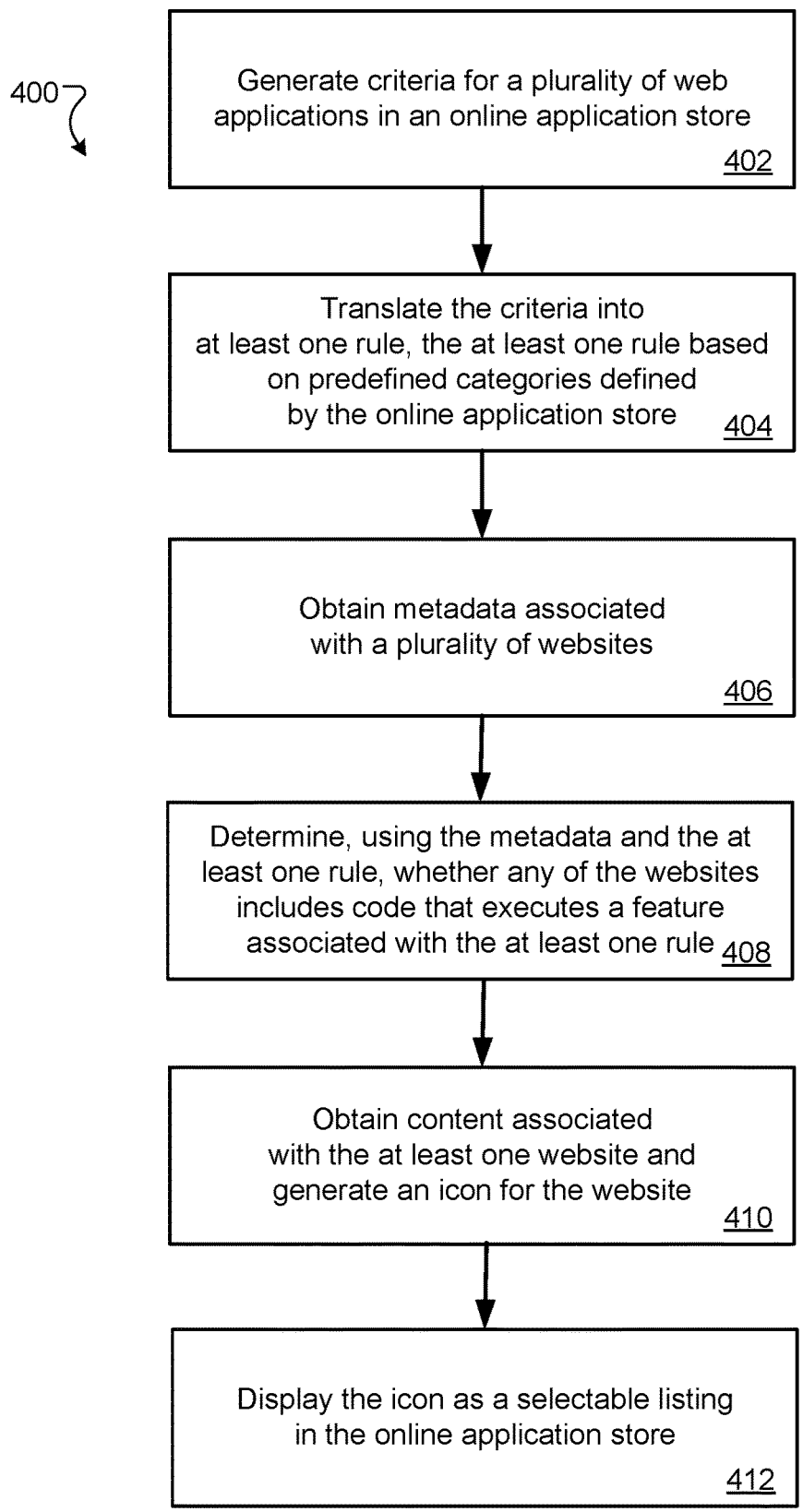
FIG. 4 illustrates an example process by which a marketplace provides application content.

FIG. 4 illustrates an example process by which a marketplace provides application content. In various embodiments, the process 400 may be used or produced by the systems such as those of FIGS. 1 and 2. Furthermore, portions of process 400 may be used to produce results such as illustrated by FIGS. 1 and 3.

Block 402 illustrates that, in one embodiment, the system 200 can generate criteria for a plurality of web applications in an online application store/online marketplace. For example, the system 200 can use information from user-based access and usage of one or more applications available in the online marketplace. The information can be used to generate particular criteria that describe and define favorable and/or dis-favorable features for each application. In some implementations, the particular criteria can include data associated with web application usage. For example, web application usage data can include information about how often users access and interact with a web application. In some implementations, the particular criteria can include data about web application installs, or how many times a web application is installed in a browser launch bar, for example. In some implementations, the particular criteria can include data about web application update queries. For example, the criteria can include data about how often queries for content in the application is searched upon, or alternatively, how often the title of the application is searched upon. In some implementations, the criteria can include data about web application user ratings. For example, the user ratings can be used to generate specific favorable or dis-favorable percentage ratings.

Any combination of the criteria can be used, at block 404, in order to translate the criteria into any number of rules. Translating the criteria into rules can include extracting category data from the criteria and comparing the extracted category data to the predefined categories defined by the online marketplace. In general, the rules can be used as a mechanism for determining whether web applications meet particular standards for the marketplace. In some implementations, the rules are based on the categories that are defined by the online marketplace. For example, the online marketplace can define categories for applications based on content in the applications, type of application, criteria associated with the application, or other data describing the applications. Example categories can include, but are not limited to services, productivity, mathematical, gaming, social networking, navigation/location based, e-commerce, health-based highly rated, poorly rated, user-recommended, marketplace recommended, highly searched, highly downloaded, poorly searched, never downloaded, cost, update status and availability, age of application, click counts, developer-uploaded, system-uploaded, manually selected, automatically selected, etc.

At block 406, the system 200 can obtain metadata associated with a plurality of web sites. Obtaining the metadata can include system 200 performing a web crawl to search for executable code associated with a web application hosted on a website. In one example, the web crawl can be configured to crawl for hostnames corresponding to any number of websites. That is, the web crawl may be specifically configured to crawl for hostnames in order to find application-like content authored by a particular hostname, and avoid attempting to analyze applications from the same duplicate content if the content is generated by the same user associated with the hostname.

The websites can pertain to a web space, a portion of the Internet, the entire Internet, etc. For example, the marketplace server 250 can automatically obtain metadata and other related content by performing a web crawl to search for data associated with web applications provided in a web space. In some implementations, the metadata can be obtained by receiving the metadata from a user/developer associated with a website. For example, users of the marketplace can upload their own content and corresponding metadata related to their particular web application. The metadata can include, but is not limited to a title, a snippet, a URL, a hostname for the URL, or a label, some or all of which can be associated with any one of the websites described above.

At block 408, the system 200 can determine, using the metadata and at least one rule, whether any of the websites in the plurality of websites, includes code that executes a feature associated with the at least one rule. For example, the server 250 can analyze the metadata to determine whether the website relating to the metadata includes application-like executable content that executes a feature associated with a rule based, such as a rule dictating an application type. The application type may pertain to a marketplace-defined category. The server 250 can analyze the metadata to determine application category information and can compare the determined category with predefined categories for the marketplace. If a match is found, the server 250 can determine, using a score, algorithm, or other metric, the likelihood that the website contains a web application that is a marketable candidate for display as an application in the marketplace, as described below in reference to FIG. 5.

In response to determining that at least one website in the plurality of websites includes code that executes a feature associated with the at least one rule, the system 200, at block 410 can obtain content associated with the website and generate an icon and/or package for the website. The icon, package, and content can be configured for placement and displayed as a selectable listing in the online marketplace, at block 412. In some implementations, the icon can be used to represent the display that provides access to the web application from a selectable listing in the online marketplace. The selectable listing may pertain to a web application that users can access, view in a browser, or otherwise interact with in the marketplace, for example. In general, the selectable listing may represent an application executable in a web browser.

In some implementations, the process 400 can also include steps of periodically, and without receiving a request from a user, (1) execute a web crawl to retrieve additional content pertaining to the plurality of websites, (2) generate, from the additional content, an updated listing, and (3) replace the listing with the updated listing and providing the updated listing in the online application store. The updated listing may be generated in response to receiving permission from a host to update the listing. In some examples, the updated listing may be auto-generated based on detecting newly available content for the application. In some implementations, the updated listing includes modified functionality based at least in part on the newly available content. In some implementations, the updated listing includes a new icon or title. In some implementations, the updated listing includes additional content related to usage of the application in the listing. Steps (1)-(3) can be pre-requested by the system 200 or in some examples, predefined by a developer to be performed upon receiving a trigger event. Example trigger events can include, detecting new version metadata, detecting that a predefined amount of time has passed, detecting that the application is non-functional, receiving user feedback about broken functionality or newly requested functions in the application, and/or receiving poor feedback, etc.

In some implementations, the process 400 can include a step of providing to a user/developer that is associated with the at least one website, information configured to enable the host to modify an application in the marketplace associated with the website. In response to receiving instructions to modify the application, the system 200 can perform the instructions to modify the application. For example, the system 200 can provide an interface or other tool to a developer in which the developer can provide instructions to update or modify their owned content. In some implementations, the developer can update the content herself using the interface described in FIG. 3, for example.

In some implementations, the systems described in this disclosure can automatically obtain application content from a website that belongs to a developer. The systems can then place application content from the website in the marketplace. The application content may not be published publically in this example, but instead can be categorized as unlisted. This may provide visibility to the application content by direct link only and may not be made searchable or otherwise listed to the general public. The systems can notify the developer about the uploaded application content. For example, the system 200 can email, text, call, etc. the developer to request feedback, permission, or other requests regarding the automatic retrieval and upload of the developer's application content. In some implementations, the system can then wait a predefined amount of time before publically publishing particular applications that are not claimed by a particular developer. In some implementations, the systems do not publically publish any of the applications or application content in the marketplace unless or until a developer provides permission to do so.

Figure 5:
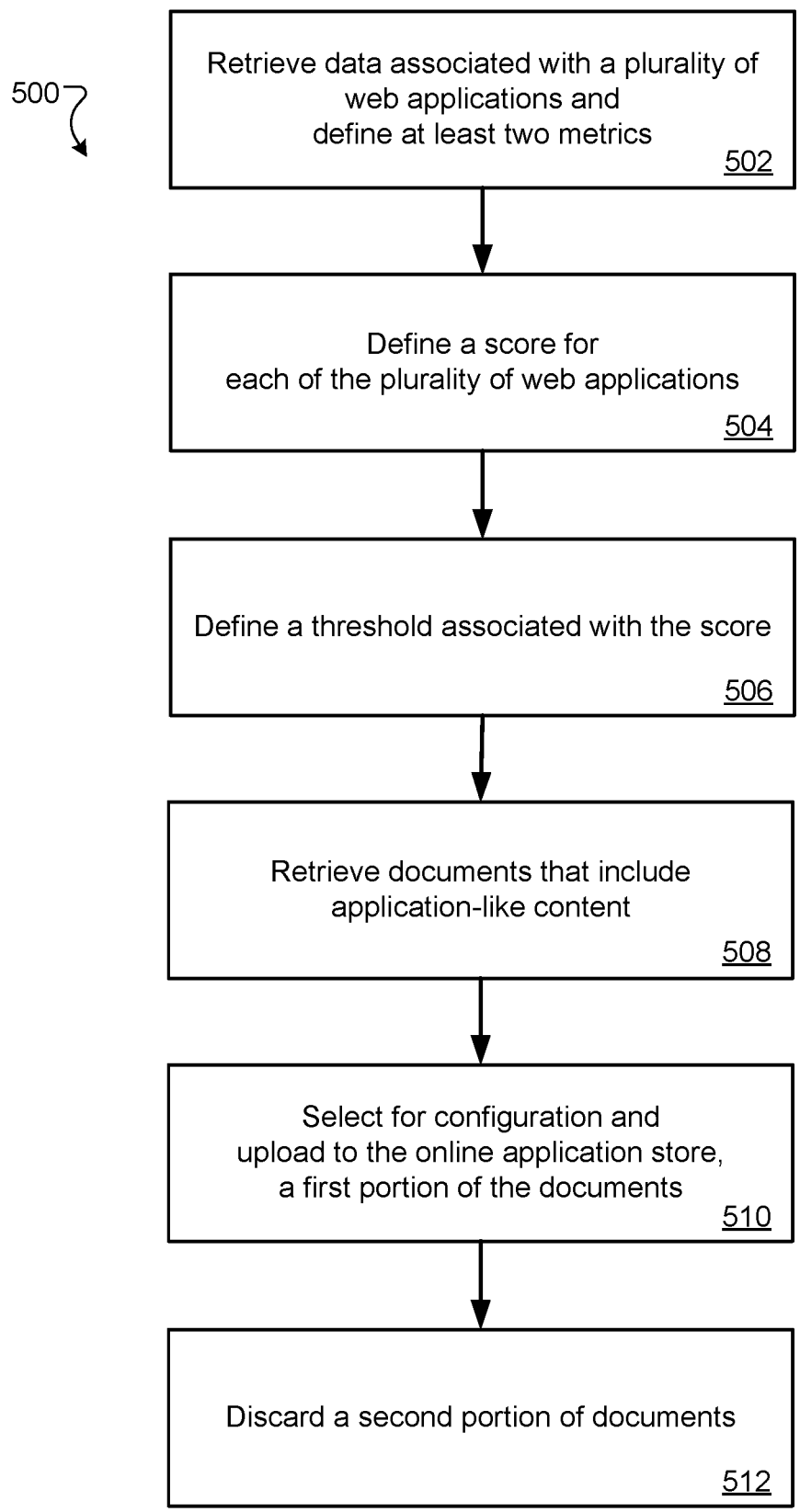
FIG. 5 illustrates an example process by which a marketplace selects application content.

FIG. 5 illustrates an example process 500 by which a marketplace selects application content for marketplace consumption. In particular, process 500 can include algorithms used to select online application content for the marketplace. In this example, the algorithm may pertain to analyzing click data. For example, the process 500 can include the analysis of a number of clicks on particular search queries related to particular web applications to determine whether a particular web application or website belongs in the marketplace. In various embodiments, the process 500 may be used or produced by the systems such as those of FIGS. 1 and 2. Furthermore, portions of process 500 may be used to produce results such as illustrated by FIGS. 1 and 3.

Block 502 illustrates that, in one embodiment, the system 200 retrieves data associated with a plurality of web applications. For example, the server 250 can retrieve metadata including one or more of a URL, a title, a description, a category, an owner name or hostname related to a related website or content in each corresponding web application, and or image content. In some implementations, the system 200 can additionally retrieve any click/impression data associated with particular search queries that are associated with the web application or with a site hosting the web application, for example. The system 250 can use the metadata or other retrieved data associated with each corresponding web application to define, for each application, at least two metrics that correspond to the data/metadata. For example, the server 250 can analyze the data or metadata (e.g., determine click data using pre-crawled web data) associated with each web application and determine metrics such as when users click on a link in the search results. The server 250 can also analyze follow up behavior that indicates when users never return to search results for a particular query again. Similarly, the system 200 can analyze whether the user returns to such search results after a long time span (e.g., weeks, months, etc.). In addition, the server 250 can determine how long an average user stayed on a particular web page once they clicked on the page. The system 200 can take this data and define it as "long click count" (LCC) data for a particular document-query pair associated with each web application.

In some implementations, the at least two metrics are selected from data associated with web application usage, web application installs, web application update queries, and web application user ratings. For example, the system 200 can track two metrics related to web application queries such as click data. In one example, the first metric may pertain to an online long click count (online_LCC) and the second metric may pertain to a download long click count (download_LCC). Once these two metrics are defined, the system 200 can analyze all popular search queries for each particular web application and at block 504, the system 200 can define a score for each of the plurality of web applications. The score may be based at least in part on the online_LCC and the download_LCC metrics. For example, for each query that contains an "online" substring, the system 200 can add its corresponding long click count to the online_LCC score. Similarly, if the query contains a "download" substring, the system 200 can add the corresponding long click count to its download_LCC score.

At block 506, the system 200 can determine and define a threshold associated with the score. The threshold can relate to particular levels of online_LCC scores and download_LCC scores. In some implementations, the threshold corresponds to a comparison made between a particular web application online_LCC score and its corresponding download_LCC score. For example, the system 200 can determine a set threshold in which the web application's download_LCC score cannot be larger than its online_LCC score. This is because if the download_LCC score is larger, the system 200 can consider the document to be a promotional page to download content (e.g., a native application) which is of no use in the marketplace because it cannot be properly provided as usable content in such a store.

At block 508, the system 200 can retrieve documents that include application-like content in response to performing a web crawl of documents that reside outside of the online application store. In some implementations, application-like content includes one or more executable web applications that provide functionality that is exposed as a service and accessed from a web browser. For example, the system 200 can retrieve websites that appear to provide executable content that meets particular marketplace/store criteria. The system 200 can then associate a document score with each of the documents according to predefined metrics (e.g., the online_LCC and the download_LCC scores described above or another set of metrics).

At block 510, the system 200 can select a portion of the documents that are associated with a document score that is above the predefined threshold. The system 200 can select the documents and configure an application configured for upload to the online application store for user consumption. In some implementations, instead of packaging and uploading the documents/applications, they can instead be ranked according to their respective online_LCC score, for example.

In the event that particular document scores fall below the predefined threshold, the system 200 can discard the corresponding documents, at block 512, and conclude that the discarded documents are not based on a user-hosted web application that is marketable or functional for the marketplace. In some implementations, discarding the documents can include determining the document/application is not eligible for upload to the marketplace, for example.

In some implementations, the method 500 can detect duplicate content and perform tasks to remove the duplicated content. For example, system 200 can include a step of determining that one or more of the documents associated with a score that is above the threshold includes duplicate URL content. The system can determine and select a start page associated with the one or more documents and configure and upload the content in the start page to the online application store while discarding any duplicate URL content. In some implementations, the system 200 is configured to only crawl hostnames in order to avoid collecting duplicate information. It is understood that the above are merely a few illustrative examples to which the disclosed subject matter is not limited.

In some implementations, the system 200 can determine whether particular applications are duplicates for applications already in the marketplace. In this example, the system 200 can detect duplicate URLs by comparing URLs associated with marketplace applications (e.g., an official website for a marketplace app, a developer's website for the marketplace app, or any support URLs associated with the marketplace app) against website URLs that the system detects and is considering adding to the marketplace. If the system 200 determines that particular domains match, then the system assumes that the application under consideration is already presented in the marketplace and thus not considered for inclusion in the marketplace.

In another example, the system 200 can perform other algorithms to detect appropriate web applications on the Internet. In some implementations, the system 200 can perform one algorithm over another algorithm or can instead combine algorithm output from any number of algorithms to obtain a set of applications for the marketplace.

For example, in the marketplace, thousands of hosted applications are available and many of these applications are accompanied by metrics that provide quality information about itself. The information can, for example, include active usage data, installation data, and particular user ratings. In some implementations, the metrics include days of data to months or years of data (e.g., 7 days, 10 days, days since inception, etc.). The system 200 can use this data to generate a score for a particular application or related website. Such data can be used as training data and the training data can be used to train a binary classifier that can predict (i.e., provide a confidence value) whether a particular application or website would be successful in the marketplace. Thus, the system 200 can use a number of classifiers to detect web applications. This approach can generally include building a binary classifier that can detect and select particular applications from the Internet. In addition, using the binary classifier, the system 200 can attempt to crawl all available websites and calculate values in order to rank and select a top percentage of applications (hosted on the websites) for repackaging in the online marketplace of digital goods.

In some implementations, non-usage data can have an effect on the confidence value. For example, if a set of web applications have not been used for a time (or ever used by more than a user or two), and then the system 200 can use that data as a metric to assign a low success score to such applications. This data can be balanced with the amount of time a particular application has been available to ensure that an application is not discarded simply for not having an audience in its infancy.

Some types of websites may not be represented in the above-described training data. The system 200 can, for example, manually discard specific website types using manually entered heuristics. For example, the following website types may be removed from any application results: download promotional pages (e.g., downloadable software for an operating system), promotional pages for mobile apps, and/or sensitive content.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. In some implementations, a computer-readable storage medium can store instructions that when executed can cause a processor (e.g., a processor of a mobile device, a processor of a host device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Process steps may be performed by one or more programmable processors executing a computer program to perform functions by operating on input data and generating output. Process steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
retrieving data associated with a plurality of web applications, and defining, for each of the plurality of web applications, at least two metrics corresponding to the data;
defining a score for each of the plurality of web applications, the score based at least in part on the at least two metrics;
defining a threshold associated with the score;
in response to performing a web crawl of documents that reside outside of an online application store, retrieving documents that include application-like content and associating a document score with each of the documents according to the at least two metrics;
selecting, for configuration and upload to the online application store, a first portion of the documents, the first portion being associated with a document score that is above the threshold; and
discarding a second portion of documents, the second portion being associated with a document score that is below the threshold.

2. The method of claim 1, wherein the at least two metrics are selected from data associated with web application usage, web application installs, web application update queries, search result interactions, click activities, and web application user ratings.

3. The method of claim 1, further comprising discarding one or more of the documents in response to determining that the one or more of the documents are not based on a user-hosted web application.

4. The method of claim 1, further comprising:
determining that one or more of the documents associated with a score that is above the threshold includes duplicate URL content;
selecting a start page associated with the one or more documents;
configuring and uploading content in the start page to the online application store; and
discarding the duplicate URL content.

5. The method of claim 1, wherein application-like content comprises one or more executable web applications that provide functionality that is exposed as a service and accessed from a web browser.

6. The method of claim 1, wherein the plurality of web applications correspond to applications available in an online application store and the at least two metrics correspond to a quality rating for the web applications.

7. A system comprising:
at least one processor;
memory storing instructions that, when executed by the at least one processor, cause the system to perform operations including:
retrieving data associated with a plurality of web applications and defining, for each of the plurality of web applications, at least two metrics corresponding to the data;
defining a score for each of the plurality of web applications, the score based at least in part on the at least two metrics;
defining a threshold associated with the score;
in response to performing a web crawl of documents that reside outside of an online application store, retrieving documents that include application-like content and associating a document score with each of the documents according to the at least two metrics;
selecting, for configuration and upload to the online application store, a first portion of the documents, the first portion being associated with a document score that is above the threshold; and
discarding a second portion of documents, the second portion being associated with a document score that is below the threshold.

8. The system of claim 7, wherein the at least two metrics are selected from data associated with web application usage, web application installs, web application update queries, search result interactions, click activities, and web application user ratings.

9. The system of claim 7, wherein the operations further comprise discarding one or more of the documents in response to determining that the one or more of the documents are not based on a user-hosted web application.

10. The system of claim 7, wherein the operations further comprise:
determining that one or more of the documents associated with a score that is above the threshold includes duplicate URL content;
selecting a start page associated with the one or more documents;
configuring and uploading content in the start page to the online application store; and
discarding the duplicate URL content.

11. The system of claim 7, wherein application-like content comprises one or more executable web applications that provide functionality that is exposed as a service and accessed from a web browser.

12. A system comprising:
a processor; and
a non-transitory computer readable storage medium having stored thereon program code that, when executed by the processor, causes the processor to:
define a score for at least one web application provided in an application store;
receive, from a web crawler, a list of web applications identified by crawling one or more websites, the web crawler being configured to perform, for the one or more websites:
retrieve a web page of the website;
determine whether the web page is a web application by checking whether the web page defines a manifest;
in response to determining that the web page is a web application, define a document score for the web page based at least in part on the score associated with the at least one web application provided in the application store, and add a uniform resource locator (URL) of the web page to the list of web applications; and
in response to determining that the document score associated with a respective web application in the list is above a predefined threshold associated with the score of the at least one web application provided in the application store, convert the respective web application into a native application that is native to the application store and make the native application available through the application store.

13. The system of claim 12 wherein the web crawler is further configured to determine, prior to adding the URL of the web page to the list of web applications, whether the web page is:
a new web application that the web crawler has not encountered before; or
an updated web application that has been modified since a last search performed by the web crawler.

14. The system of claim 13 wherein the web crawler determines whether the web page is a new web application or an updated web application by determining whether the manifest defined by the web page is a new manifest that the web crawler has not encountered before.

15. The system of claim 12 wherein the program code further causes the processor to calculate a quality score for each web application in the list.

16. The system of claim 15 wherein the quality score is calculated based on a degree of popularity of a URL or web domain of said each web application in web search rankings.

17. The system of claim 15 wherein the quality score is calculated based on how often said each web application is searched for in the application store.

18. The system of claim 15 wherein said each web application is not converted into the native application if the quality score falls below a predefined threshold.

19. The method of claim 1, wherein the at least two metrics are used to determine user interactions with a respective web application provided in the application store.

20. The system of claim 12, wherein the program code further causes the processor to discard a respective web application in the list in response to determining that the document score associated with the respective web application in the list is below the predefined threshold.

21. A method comprising:
defining a score for at least one web application provided in an application store;
receiving, from a web crawler, a list of web applications identified by crawling one or more websites,
for the one or more websites:
retrieving a web page of the website;
determining whether the web page is a web application by checking whether the web page defines a manifest;
in response to determining that the web page is a web application, defining a document score for the web page based at least in part on the score associated with the at least one web application provided in the application store, and add a uniform resource locator (URL) of the web page to the list of web applications; and
in response to determining that the document score associated with a respective web application in the list is above a predefined threshold associated with the score of the at least one web application provided in the application store, converting the respective web application into a native application that is native to the application store to make the native application available through the application store.

22. The method of claim 21, wherein the web crawler is further configured to determine prior to adding the URL of the web page to the list of web applications, whether the web page is:
a new web application that the web crawler has not encountered before; or
an updated web application that has been modified since a last search performed by the web crawler.

23. The method of claim 22, wherein the web crawler is further configured to determine whether the web page is a new web application or an updated web application by determining whether the manifest defined by the web page is a new manifest that the web crawler has not encountered before.

24. The method of claim 21, further comprising calculating a quality score for each web application in the list.

25. The method of claim 24, wherein the quality score is calculated based on a degree of popularity of a URL or web domain of said each web application in web search rankings.

26. The method of claim 24, wherein the quality score is calculated based on how often said each web application is searched for in the application store.

27. The method of claim 24, wherein said each web application is not converted into the native application if the quality score falls below a predefined threshold.

28. The method of claim 21, further comprising:
discarding a respective web application in the list in response to determining that the document score associated with the respective web application in the list is below the predefined threshold.

* * * * *